(12) United States Patent
Kwon et al.

(10) Patent No.: US 11,465,465 B2
(45) Date of Patent: Oct. 11, 2022

(54) AIR VENTILATION DEVICE OF VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Dong Ho Kwon, Yongin-si (KR); Jai Hak Kim, Gunpo-si (KR); Gee Young Shin, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 557 days.

(21) Appl. No.: 16/269,008

(22) Filed: Feb. 6, 2019

(65) Prior Publication Data

US 2020/0130464 A1  Apr. 30, 2020

(30) Foreign Application Priority Data

Oct. 26, 2018 (KR) .................... 10-2018-0129138

(51) Int. Cl.
*B60H 1/00* (2006.01)

(52) U.S. Cl.
CPC ..... *B60H 1/00842* (2013.01); *B60H 1/00678* (2013.01); *B60H 2001/00092* (2013.01); *B60H 2001/00721* (2013.01)

(58) Field of Classification Search
CPC ............ B60H 1/00842; B60H 1/00678; B60H 1/00064; B60H 1/00028; B60H 1/00546; B60H 2001/00092; B60H 2001/00721; B60H 2001/00085; B60H 2001/002; B60H 2001/00607

USPC .......................................... 454/145
See application file for complete search history.

(56) References Cited

U.S. PATENT DOCUMENTS

| 5,681,218 | A | * | 10/1997 | Kishi | ................. | B60H 3/0085 |
|---|---|---|---|---|---|---|
| | | | | | | 454/139 |
| 2005/0067158 | A1 | * | 3/2005 | Ito | ...................... | B60H 1/00885 |
| | | | | | | 165/204 |
| 2018/0022182 | A1 | * | 1/2018 | Miller | ................ | B60H 1/00742 |
| | | | | | | 165/203 |
| 2018/0326812 | A1 | * | 11/2018 | Ko | ..................... | B60H 1/00692 |
| 2018/0370337 | A1 | * | 12/2018 | Nakado | ............. | B60H 1/00849 |
| 2019/0232843 | A1 | * | 8/2019 | Welch | .................. | B60N 2/5621 |

FOREIGN PATENT DOCUMENTS

KR    10-2015-0106205 A    9/2015

* cited by examiner

*Primary Examiner* — Avinash A Savani
*Assistant Examiner* — Dana K Tighe
(74) *Attorney, Agent, or Firm* — Morgan, Lewis & Bockius LLP (57) ABSTRACT

An air ventilation device of a vehicle includes: a housing including an air inlet and an air outlet and a cooling core and a heating core disposed between the air inlet and the air outlet; a rear extending flow path extending to the rear of the vehicle, and having a first end connected to the air outlet of the housing and a second end connected to a back seat air vent disposed to face a back seat space; an air collecting flow path directly connecting the rear extending flow path and the air inlet of the housing; and an opening and closing door structure opening and closing air circulation between the rear extending flow path and the air outlet and air circulation between the air collecting flow path and the air inlet.

15 Claims, 7 Drawing Sheets

AIR VENTILATION DEVICE OF VEHICLE AND METHOD FOR CONTROLLING THE SAME

CROSS REFERENCE TO RELATED APPLICATION

The present application claims priority to Korean Patent Application No. 10-2018-0129138, filed Oct. 26, 2018, the entire contents of which is incorporated herein for all purposes by this reference.

TECHNICAL FIELD

The present disclosure relates to an air ventilation device (i.e., a heating, ventilating, and air conditioning (HVAC) system) of a vehicle and a method for controlling the same, capable of introducing air discharged from a front seat to a rear side and re-circulating the same when a rear ventilation function is not in use.

BACKGROUND

Conventionally, an air ventilation device is provided at the front of a vehicle and the air conditioned by the air ventilation device is discharged to a front seat and a back seat to cool and heat an indoor area. When discharging air to the back seat, a flow path extends from the center to discharge conditioned air from a center console between the front seat and the back seat toward a rear side of the vehicle, thus enhancing riding convenience of an occupant in the back seat.

As fuel efficiency of vehicles becomes important and electric vehicles have been used, a scheme of increasing fuel efficiency by re-introducing indoor air to perform re-conditioning and re-circulation in terms of energy has come to prominence. In this case, however, if only an existing inside air circulation structure is used, only a portion of air already discharged to a rear side of a vehicle may be re-circulated, which is not energy-efficient.

The above information disclosed in this background section is only for enhancement of understanding of the background of the invention, and therefore, it may contain information that does not form the prior art that is already known in this country to a person of ordinary skill in the art.

The foregoing is intended merely to aid in the understanding of the background of the present disclosure, and is not intended to mean that the present disclosure falls within the purview of the related art that is already known to those skilled in the art.

SUMMARY

An object of the present disclosure is to provide an air ventilation device of a vehicle and a method for controlling the same, capable of introducing air discharged from a front seat to a rear side and re-circulating the same when a rear ventilation function is not in use, thus improving air-conditioning efficiency.

According to an embodiment of the present disclosure, an air ventilation device of a vehicle includes: a housing including an air inlet and an air outlet and a cooling core and a heating core disposed between the air inlet and the air outlet; a rear extending flow path extending to the rear of the vehicle, and having a first end connected to the air outlet of the housing and a second end connected to a back seat air vent disposed to face a back seat space; an air collecting flow path directly connecting the rear extending flow path and the air inlet of the housing; and an opening and closing door structure opening and closing air circulation between the rear extending flow path and the air outlet and air circulation between the air collecting flow path and the air inlet.

One end of the air collecting flow path may be connected to the first end of the rear extending flow path and another end of the air collecting flow path may be connected to the air inlet of the housing.

The other end of the air collecting flow path may be connected to an inside air entrance formed at the air inlet side of the housing.

The opening and closing door structure may include a back seat air-conditioning door provided at the rear extending flow path and opening and closing air circulation between the rear extending flow path and the air outlet and an air collecting door provided at the air collecting flow path and opening and closing air circulation between the air collecting flow path and the air inlet.

The back seat air-conditioning door may be provided on an upstream side of a point where the air collecting flow path is connected to the rear extending flow path.

The air collecting door and the back seat air-conditioning door may be connected by a power transmission structure and interwork with each other, and when the air collecting door is opened, the back seat air-conditioning door may be closed, and when the air collecting door is closed, the back seat air-conditioning door may be opened.

The air ventilation device may further include: a controller controlling the opening and closing door structure to open air circulation between the rear extending flow path and the air outlet in a back seat air-conditioning mode and to open air circulation between the air collecting flow path and the air inlet in an air collecting mode.

The controller may control the opening and closing door structure to close air circulation between the air collecting flow path and the air inlet in the back seat air-conditioning mode and to close air circulation between the rear extending flow path and the air outlet in the air collecting mode.

When an occupant in a back seat is sensed, the controller may realize the back seat air-conditioning mode, and when an occupant in the back seat is not sensed, the controller may realize the air collecting mode.

In a defrost mode, the controller may control the opening and closing door structure to close air circulation between the air collecting flow path and the air inlet.

An inside air entrance and an outside air entrance may be formed on the air inlet side of the housing, an air filter may be provided adjacent to the air inlet in an internal space of the housing, a space may be formed between a point where the inside air entrance and the outside air entrance are formed and the air filter, and the air collecting flow path may be connected to the space to directly connect the rear extending flow path and the air inlet of the housing.

The back seat air vent may be provided at a center console between a front seat and a back seat, and the rear extending flow path may extend from a floor of the vehicle and may be connected to the back seat air vent at the center console.

The air ventilation device may further include a controller controlling the opening and closing door structure to close air circulation between the rear extending flow path and the air outlet and air circulation between the air collecting flow path and the air inlet in case of a back seat air-conditioning mode and a heating mode simultaneously.

According to another embodiment of the present disclosure, a method for controlling an air ventilation device of a vehicle includes: determining, by a controller, an air-conditioning control mode; when the air-conditioning control mode is a back seat air-conditioning mode, controlling, by the controller, an opening and closing door structure to open air circulation between a rear extending flow path connected to a back seat air vent and an air outlet so that air-conditioned air is discharged through the back seat air vent; and when the air-conditioning control mode is an air collecting mode, controlling, by the controller, the opening and closing door structure to open air circulation between an air collecting flow path connected to a rear extending flow path and an air inlet so that inside air is introduced to a housing through the back seat air vent.

In the operation in which the air-conditioned air is discharged through the back seat air vent, the opening and closing door structure may be controlled to close air circulation between the air collecting flow path and the air inlet, and in the operation in which inside air is introduced to the housing through the back seat air vent, the opening and closing door structure may be controlled to close air circulation between the rear extending flow path and the air outlet.

DETAILED DESCRIPTION OF THE EMBODIMENTS

Hereinafter, an air ventilation device of a vehicle and a method for controlling the same according to embodiments of the present disclosure is described with reference to the accompanying drawings.

Figure 1:
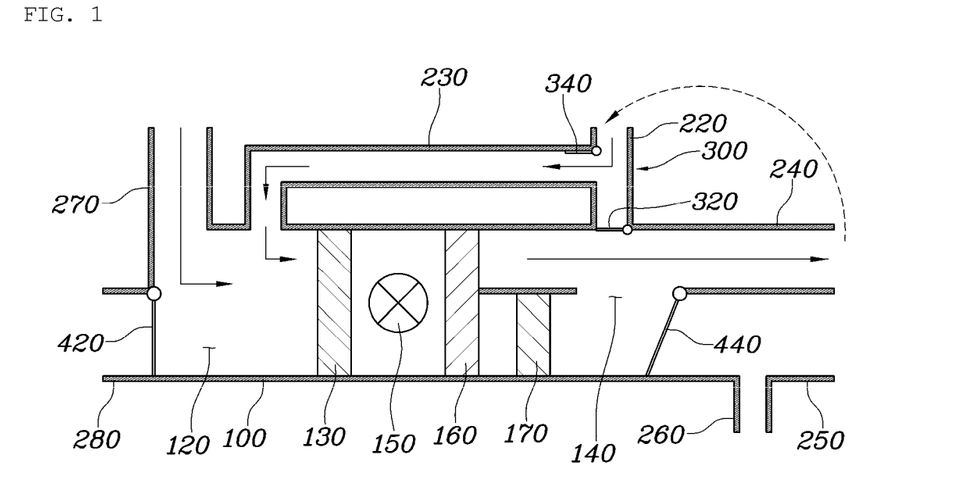
FIG. 1 is a view illustrating a case where an air ventilation device of a vehicle is in a front seat cooling mode according to an embodiment of the present disclosure.
Figure 2:
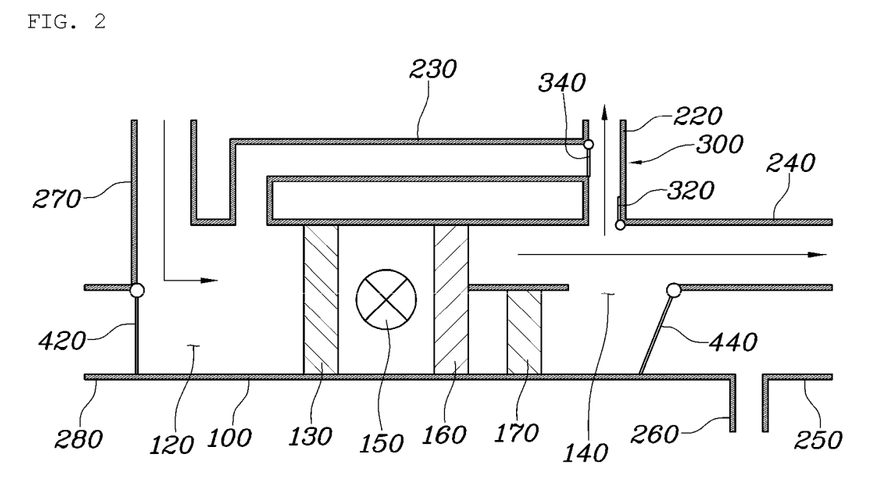
FIG. 2 is a view illustrating a case where an air ventilation device of a vehicle is in a back seat cooling mode according to an embodiment of the present disclosure.
Figure 3:
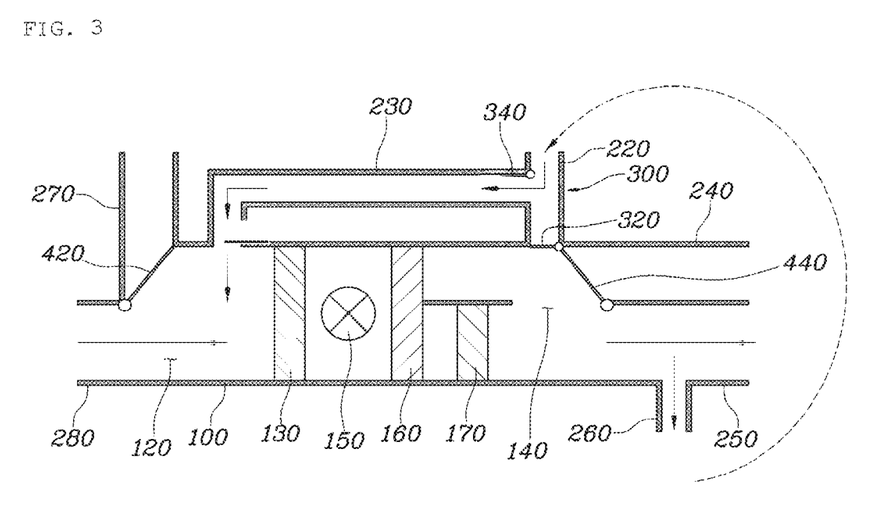
FIG. 3 is a view illustrating a case where an air ventilation device of a vehicle is in a front seat heating mode according to an embodiment of the present disclosure.
Figure 4:
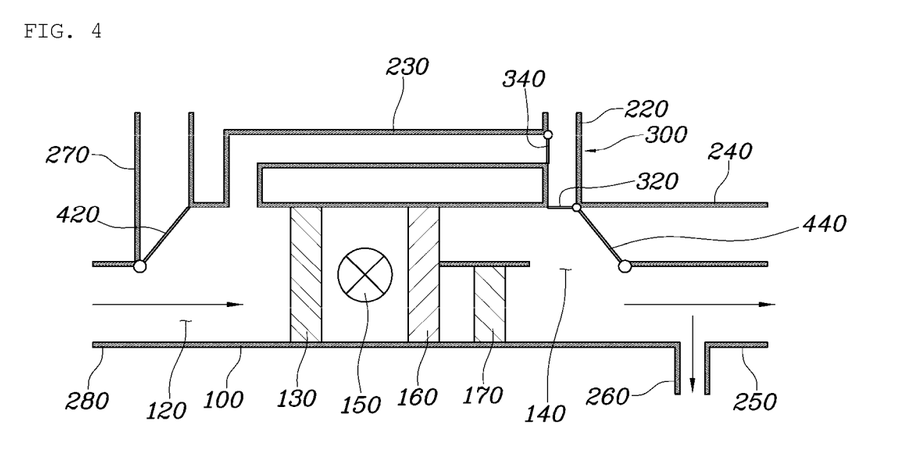
FIG. 4 is a view illustrating a case where an air ventilation device of a vehicle is in a back seat heating mode according to an embodiment of the present disclosure.
Figure 5:
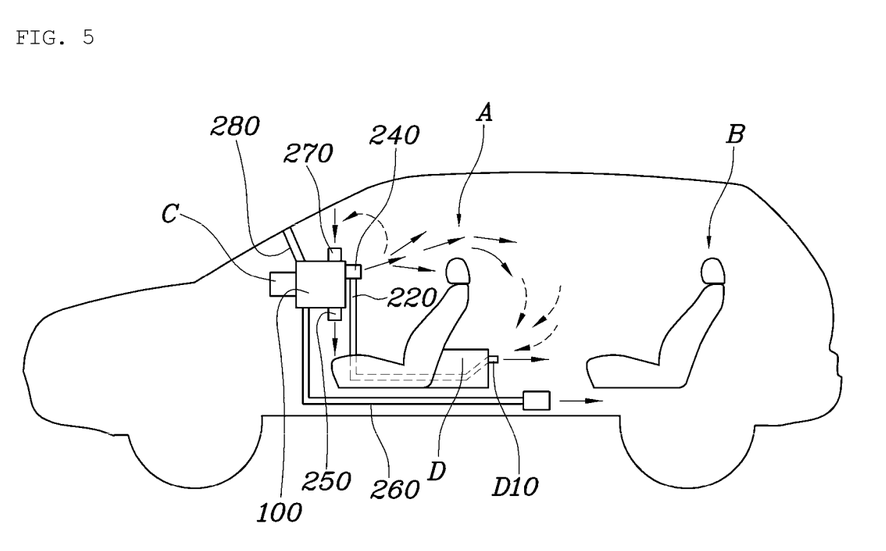
FIG. 5 is a view illustrating a configuration of an air ventilation device of a vehicle according to an embodiment of the present disclosure.
Figure 6:
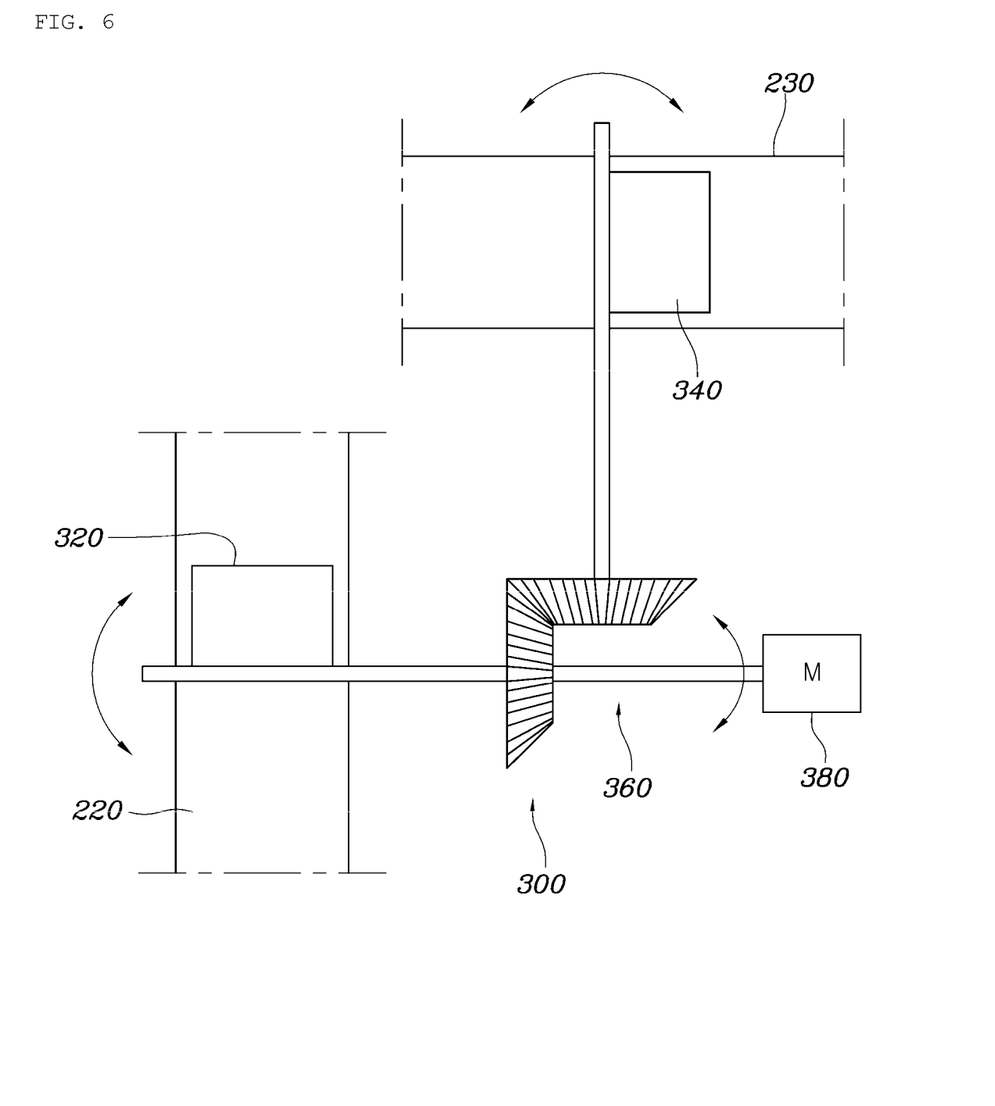
FIG. 6 is a view illustrating a power transmission structure of an air ventilation device of a vehicle according to an embodiment of the present disclosure.
Figure 7:
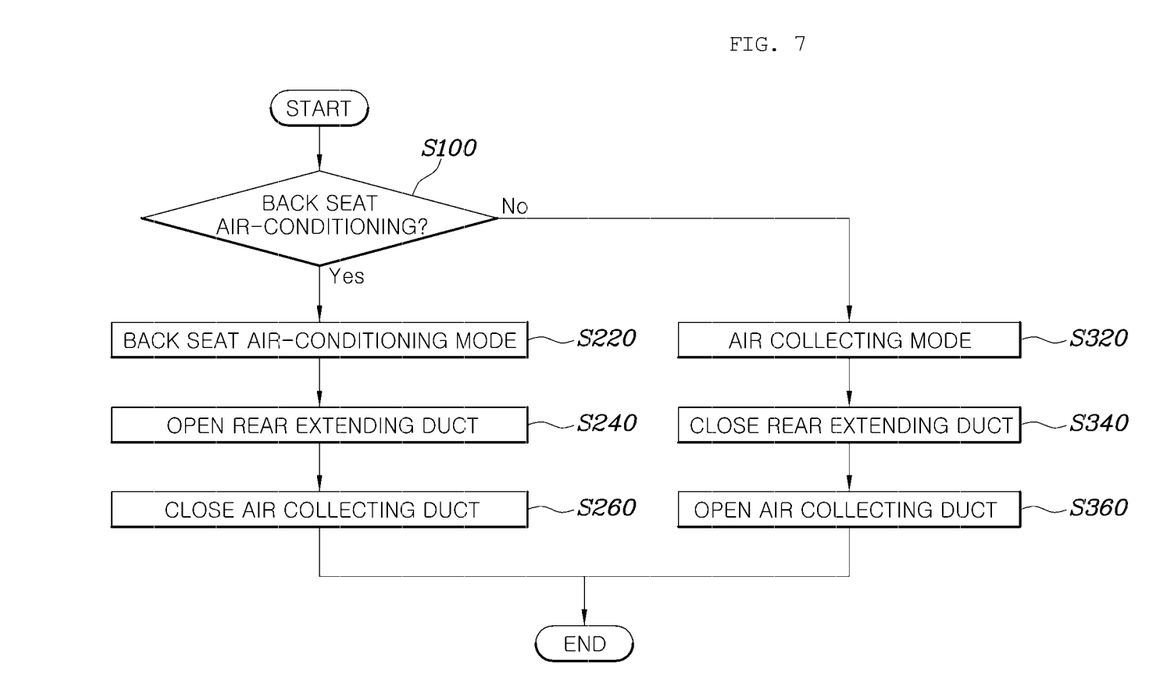
FIG. 7 is a flowchart of a method for controlling an air ventilation device of a vehicle according to an embodiment of the present disclosure.

FIG. 1 is a view illustrating a case where an air ventilation device of a vehicle is in a front seat cooling mode according to an embodiment of the present disclosure, FIG. 2 is a view illustrating a case where an air ventilation device of a vehicle is in a back seat cooling mode according to an embodiment of the present disclosure, FIG. 3 is a view illustrating a case where an air ventilation device of a vehicle is in a front seat heating mode according to an embodiment of the present disclosure, FIG. 4 is a view illustrating a case where an air ventilation device of a vehicle is in a back seat heating mode according to an embodiment of the present disclosure, FIG. 5 is a view illustrating a configuration of an air ventilation device of a vehicle according to an embodiment of the present disclosure, FIG. 6 is a view illustrating a power transmission structure of an air ventilation device of a vehicle according to an embodiment of the present disclosure, and FIG. 7 is a flowchart of a method for controlling an air ventilation device of a vehicle according to an embodiment of the present disclosure.

FIG. 5 is a view illustrating a configuration of an air ventilation device of a vehicle according to an embodiment of the present disclosure, and FIGS. 1 to 4 illustrate operations according to respective modes. The air ventilation device of a vehicle according to the present disclosure includes a housing 100 including an air inlet 120 and an air outlet 140 and a cooling core 160 and a heating core 170 provided between the air inlet 120 and the air outlet 140; a rear extending flow path 220 having one end connected to the air outlet 140 of the housing 100, extending to the rear of the vehicle, and having the other end connected to a back seat air vent D10 disposed to face a back seat B space; an air collecting flow path 230 directly connecting the rear extending flow path 220 and the air inlet 120 of the housing 100; and an opening and closing door structure 300 opening and closing air circulation between the rear extending flow path 220 and the air outlet 140 and air circulation between the air collecting flow path 230 and the air inlet 120.

The housing 100 is installed in the vehicle to serve to introduce air, cool, heat or mix the introduced air, and subsequently discharge the same through each flow path. A blower 150 is provided in the housing 100 to provide power for air flow. In addition, an air filter 130 is provided to purify the introduced air and discharge the purified air to the indoor area.

Specifically, the housing 100 of the present disclosure has the air inlet 120 and the air outlet 140, and the cooling core 160 and the heating core 170 interposed between the air inlet 120 and the air outlet 140. Space of the vehicle is divided into a front seat A and a back seat B, and a seat is installed accordingly. The front seat A and the back seat B may be determined according to relative front-back layout order, and the back seat B may be provided in a plurality of rows. In case of an internal combustion engine vehicle, the heating core 170 may be heated by a hot engine coolant, while, in case of an electric vehicle, or the like, a separate heating element may be used as the heating core 170, or the heating core 170 may indirectly be heated using a heating element. Alternatively, the heating core 170 may be heated using a heat pump system utilizing a coolant, or the like. That is, various methods may be used.

In the case of the front seat A, air is discharged directly from a center fascia on the front of the vehicle to perform cooling, and air is discharged toward a floor side of the front seat A to perform heating.

In the case of the back seat B, in order to perform cooling, air is discharged to the rear through a rear extending flow path 220 extending along a center tunnel toward a center console D to perform cooling, and in order to perform heating, air is discharged to the bottom of the back seat B through a floor flow path 260 extending to the rear side along the floor.

The rear extending flow path 220 is connected in one end to the air outlet 140 of the housing 100, extends to the rear of the vehicle, and connected in the other end to the back seat air vent D10 disposed to face the back seat space. Specifically, the back seat air vent D10 is provided at the center console D between the front seat A and the back seat B, and the rear extending flow path 220 may extend along the floor of the vehicle and may be connected to the back seat air vent D10 at the center console D. The rear extending flow path 220 may be a separate duct structure extending from the housing 100.

The air collecting flow path 230 connects the rear extending flow path 220 directly to the air inlet 120 of the housing 100. An opening and closing door structure 300 is provided to open and close air circulation between the rear extending flow path 220 and the air outlet 140 and air circulation between the air collecting flow path 230 and the air inlet 120. The air collecting flow path 230 may be provided inside or outside the housing 100. In case where the air collecting flow path 230 is provided inside the air ventilation device, the air collecting flow path 230 may be integrally formed in the housing, like various flow paths formed inside the air ventilation device of the vehicle.

Through the connection structure of the flow paths, cold air discharged from the front seat center fascia cools the front seat A and is subsequently introduced again in order of the back seat air vent D10 of the center console D, the rear extending flow path 220, and the air collecting flow path 230 from the rear side, air-conditioned again inside the housing 100, and discharged again, and thus, cooling efficiency may be significantly increased. Most conventional vehicles also have structures for inside air circulation, but such structures are generally provided in the center fascia to merely re-introduce air staying on the front of an indoor area, rather than re-introducing air discharged to the rear side, and thus, efficiency of re-circulation was very low.

In particular, in case where the occupant sits only in the front seat A of the vehicle, air-conditioning is unnecessary in the back seat B of the vehicle. Thus, in the case of the structure of the present disclosure, since the loop in which cold air is circulated only in the front seat A as illustrated in FIG. 5 may be formed, the structure of the present disclosure is very effective in terms of energy.

To this end, one end of the air collecting flow path 230 may be connected to one end side of the rear extending flow path 220 and the other end thereof may be connected to the air inlet 120 of the housing 100. The other end of the air collecting flow path 230 may be connected to an inside air entrance 270 formed on the air inlet 120 side of the housing 100. Accordingly, the rear extending flow path 220 selectively performs two types of roles of discharging the air to the rear side or introducing the air from the rear side.

The inside air entrance 270 and an outside air entrance 280 are formed on the air inlet 120 side of the housing 100, and the air filter 130 is provided adjacent to the air inlet 120 in the internal space of the housing 100. A space is formed between a point where the inside air entrance 270 and the outside air entrance 280 are formed and the air filter 130, and the air collecting flow path 230 may be connected to the space to directly connect the rear extending flow path 220 and the air inlet 120 of the housing 100. Accordingly, the present disclosure may be easily applied even to the housing of the air ventilation device applied to the related art. That is, the existing space is utilized and only one flow path and one door may be added to implement even without changing a design.

The opening and closing door structure 300 may include a back seat air-conditioning door 320 provided at the rear extending flow path 220 and opening and closing air circulation between the rear extending flow path 220 and the air outlet 140 and an air collecting door 340 provided at the air collecting flow path 230 and opening and closing air circulation between the air collecting flow path 230 and the air inlet 120.

Specifically, the back seat air-conditioning door 320 may be provided on an upstream side of a point where the air collecting flow path 230 is connected to the rear extending flow path 220. Accordingly, the rear extending flow path 220 reliably separately performs the two types of roles of discharging air to the rear side or introducing air from the rear side.

As illustrated in FIG. 6, the air collecting door 340 and the back seat air-conditioning door 320 are connected by a power transmission structure 360 and interwork with each other. In this case, only one actuator 380 may be used so that when the air collecting door 340 is opened, the back seat air-conditioning door 320 is closed. When the air collecting door 340 is closed, the back seat air-conditioning door 320 may be opened. Alternatively, actuators may be connected to the doors to control the doors, respectively.

A controller C realizes various air-conditioning modes by controlling operations of various doors. Specifically, FIG. 2 illustrates a case where the air ventilation device of the vehicle is in a back seat cooling mode according to an embodiment of the present disclosure, and FIG. 4 illustrates a case where the air ventilation device of the vehicle is in a back seat heating mode according to an embodiment of the present disclosure.

In the back seat air-conditioning mode, the controller C controls the opening and closing door structure 300 to open air circulation between the rear extending flow path 220 and the air outlet 140, and in the air collecting mode, the controller C controls the opening and closing door structure 300 to open air circulation between the air collecting flow path 230 and the air inlet 120. Here, the controller C may control the opening and closing door structure 300 to close air circulation between the air collecting flow path 230 and the air inlet 120 in the back seat air-conditioning mode and to close air circulation between the rear extending flow path 220 and the air outlet 140 in the air collecting mode.

That is, as illustrated in FIG. 2, in the back seat cooling mode, the back seat air-conditioning door 320 is opened to allow cooled air to be supplied to the rear extending flow path 220, and in this case, the air collecting door 340 is closed so that air in the back seat may not be introduced to the front side, whereby an occupant in the back seat may feel comfortable. As illustrated in FIG. 4, in the back seat heating mode, heated air is supplied to the floor of the back seat through the floor flow path 260. In this case, the back seat air-conditioning door 320 is closed to prevent heated air heated from moving to the rear extending flow path 220, thus reducing displeasure of the occupant in the back seat. Further, the air collecting door 340 is closed so that the occupant in the back seat may sufficiently feel warmth. In this case, it is also possible to increase efficiency by opening the air collecting door 340 to re-circulate heated air.

In the case of the front seat cooling mode as illustrated in FIG. 1, the back air-conditioning door 320 is closed and the air collecting door 340 is opened as described above so that cold air discharged from the front side to the rear side air-conditions the front seat A, is immediately flows in again to be introduced to the front side through the rear extending flow path 220, air-conditioned again, and discharged again to effectively use energy to maximize comfortable sensation of the occupant in the front seat. Further, in the case of the front seat heating mode as illustrated in FIG. 3, the back seat air-conditioning door 320 is closed and the air collecting door 340 is opened so that only the front seat A may become heated, thus saving energy.

Then, when an occupant in the back seat is sensed, the controller C may realize the back seat air-conditioning mode, and when an occupant in the back seat is not sensed, the controller C may realize the air collecting mode, whereby automatically optimally performing control, and here, various types of sensors such as a camera, capacitance, a weight sensor, and the like, may be used to sense an occupant in the back seat.

In particular, the controller C controls the opening/closing door structure 300 to close air circulation between the air collecting flow path 230 and the air inlet 120 in a defrost mode, thereby saving energy within a range in which safety of vehicle operation is not hindered. In the winter, warm and humid indoor air is condensed in a cold windshield to cause a visual field of the windshield to be occluded. In order to remove this, the controller C realizes the defrost mode. In this case, outside air, rather than internal humid air of the vehicle, is generally used, so outside air is heated and discharged toward the wind shield. In this case, circulation of inside air is not necessary, and thus, the opening and closing door structure 300 is controlled to close air circulation between the air collecting flow path 230 and the air inlet 120 in the defrost mode.

FIG. 7 is a flowchart of a method for controlling an air ventilation device of a vehicle according to an embodiment of the present disclosure. The method for controlling an air ventilation device of a vehicle according to an embodiment of the present disclosure includes determining an air-conditioning control mode (S100); when the air-conditioning control mode is a back seat air-conditioning mode, controlling an opening and closing door structure to open air circulation between a rear extending flow path connected to a back seat air vent and an air outlet so that air-conditioned air is discharged through the back seat air vent (S220, S240); and when the air-conditioning control mode is an air collecting mode, controlling the opening and closing door structure to open air circulation between an air collecting flow path connected to the rear extending flow path and an air inlet so that inside air is introduced to a housing through the back seat air vent (S320, S340). The air collecting mode refers to a case of collecting air because only the front seat is air-conditioned.

In operation S220 in which the air-conditioned air is discharged through the back seat air vent, the opening and closing door structure may be controlled by a controller to close air circulation between the air collecting flow path and the air inlet (S260), and in operation S320 in which inside air is introduced to the housing through the back seat air vent, the opening and closing door structure may be controlled by the controller to close air circulation between the rear extending flow path and the air outlet (S360).

According to the air ventilation device of a vehicle and the method for controlling the same of the present disclosure, when the back seat air-conditioning function is not used, air discharged from the front seat is introduced again from the rear side and re-circulated, whereby air-conditioned air may be re-introduced after it is sufficiently used.

According to the present disclosure, since air discharged from the front side to the rear side is introduced from the rear side, rather than from the front side and the discharged air-conditioned air is re-introduced and re-circulated as much as possible, thereby increasing energy efficiency.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. An air ventilation device of a vehicle comprising:
a housing including an air inlet and an air outlet, wherein a cooling core and a heating core are disposed between the air inlet and the air outlet;
a rear extending flow path extending toward a rear side of the vehicle and having:
a first end connected to the air outlet of the housing; and
a second end connected to a back seat air vent which is disposed to face a back seat space;
an air collecting flow path directly connecting the rear extending flow path and the air inlet of the housing; and
an opening and closing door structure for opening and closing air circulation between the rear extending flow path and the air outlet and air circulation between the air collecting flow path and the air inlet, wherein
the opening and closing door structure includes:
a back seat air-conditioning door disposed at the rear extending flow path, and opening air circulation between the rear extending flow path and the air outlet in a back seat air-conditioning mode and closing air circulation between the rear extending flow path and the air outlet in an air collecting mode; and
an air collecting door disposed at the air collecting flow path, and opening air circulation between the air collecting flow path and the air inlet in an air collecting mode, and closing air circulation between the air collecting flow path and the air inlet in a back seat air-conditioning mode,
wherein
the housing of the air ventilation device is disposed in front of a front seat of the vehicle,
the back seat air vent is disposed between the front seat and a back seat of the vehicle, and
air discharged from the air ventilation device is introduced again through the back seat air vent to circulate in the air ventilation device in accordance with a selected air-conditioning control mode, the air-conditioning control mode being selected from a plurality of control modes including the back seat air-conditioning mode and the air collecting mode,
wherein
a first end of the air collecting flow path is connected to the first end of the rear extending flow path, and a second end of the air collecting flow path is connected to an inside air entrance of the air inlet of the housing.

2. The air ventilation device of claim 1, wherein
a first end of the air collecting flow path is connected to the first end of the rear extending flow path, and a second end of the air collecting flow path is connected to the air inlet of the housing.

3. The air ventilation device of claim 2, wherein
the second end of the air collecting flow path is connected to an inside air entrance of the air inlet.

4. The air ventilation device of claim 1, wherein
the back seat air-conditioning door is disposed on an upstream side at which the air collecting flow path is connected to the rear extending flow path.

5. The air ventilation device of claim 1, wherein
the air collecting door and the back seat air-conditioning door are connected and interwork with each other,
wherein, when the air collecting door is opened, the back seat air-conditioning door is closed, and when the air collecting door is closed, the back seat air-conditioning door is opened.

6. The air ventilation device of claim 1, further comprising:
a controller controlling the configuration of the opening and closing door structure to open air circulation between the rear extending flow path and the air outlet in the back seat air-conditioning mode and to open air circulation between the air collecting flow path and the air inlet in the air collecting mode.

7. The air ventilation device of claim 6, wherein
the controller controls the configuration of the opening and closing door structure to close air circulation between the air collecting flow path and the air inlet in the back seat air-conditioning mode and to close air circulation between the rear extending flow path and the air outlet in the air collecting mode.

8. The air ventilation device of claim 6, further comprising a sensor configured to sense a presence of an occupant in the back seat, wherein
when the sensor senses the presence of the occupant in the back seat, the controller realizes the back seat air-conditioning mode, and when the sensor does not sense the presence of the occupant in the back seat, the controller realizes the air collecting mode.

9. The air ventilation device of claim 6, wherein the plurality of control modes further includes a defrost mode, and wherein
in the defrost mode, the controller controls the configuration of the opening and closing door structure to close air circulation between the air collecting flow path and the air inlet.

10. The air ventilation device of claim 1, wherein
the air inlet of the housing includes an inside air entrance and an outside air entrance,
the housing includes an air filter adjacent to the air inlet in an internal space of the housing,
the air filter is spaced apart from a point where the inside air entrance and the outside air entrance meet, and
the air collecting flow path is connected to the space to directly connect the rear extending flow path and the air inlet of the housing.

11. The air ventilation device of claim 1, wherein
the back air vent is disposed at a center console between the front seat and the back seat, and
the rear extending flow path extends from a floor of the vehicle and is connected to the back seat air vent at the center console.

12. The air ventilation device of claim 1, wherein the air collecting door and the back seat air-conditioning door are connected by a power transmission structure such that controlling the power transmission structure opens the air collecting door and closes the back seat air-conditioning door at the same time or closes the air collecting door and opens the back seat air-conditioning door at the same time.

13. A method for controlling an air ventilation device of a vehicle, the air ventilation device including:
a housing including an air inlet and an air outlet, wherein a cooling core and a heating core are disposed between the air inlet and the air outlet;
a rear extending flow path extending toward a rear side of the vehicle and having:
a first end connected to the air outlet of the housing; and
a second end connected to a back seat air vent which is disposed to face a back seat space;
an air collecting flow path directly connecting the rear extending flow path and the air inlet of the housing; and
an opening and closing door structure for opening and closing air circulation between the rear extending flow path and the air outlet and air circulation between the air collecting flow path and the air inlet, wherein
the opening and closing door structure includes:
a back seat air-conditioning door disposed at the rear extending flow path and opening and closing air circulation between the rear extending flow path and the air outlet; and
an air collecting door disposed at the air collecting flow path and opening and closing air circulation between the air collecting flow path and the air inlet,
wherein
the housing of the air ventilation device is disposed in front of a front seat of the vehicle,
the back seat air vent is disposed between the front seat and a back seat of the vehicle, and
air discharged from the air ventilation device is introduced again through the back seat air vent to circulate in the air ventilation device in accordance with a selected air-conditioning control mode, the air-conditioning control mode being selected from a plurality of control modes including the back seat air-conditioning mode and the air collecting mode, wherein
a first end of the air collecting flow path is connected to the first end of the rear extending flow path, and a second end of the air collecting flow path is connected to an inside air entrance of the air inlet of the housing,
the method comprising:
determining, by a controller, the air-conditioning control mode;
when the air-conditioning control mode is a back seat air-conditioning mode, controlling, by the controller, the configuration of the opening and closing door structure to open air circulation between the rear extending flow path connected to the back seat air vent and the air outlet so that air-conditioned air is discharged through the back seat air vent; and
when the air-conditioning control mode is an air collecting mode, controlling, by the controller, the configuration of the opening and closing door structure to open air circulation between the air collecting flow path connected to the rear extending flow path and the air inlet so that inside air is introduced to the housing through the back seat air vent.

14. The method of claim 13, wherein
when the air-conditioned air is discharged through the back seat air vent, the configuration of the opening and closing door structure is controlled to close air circulation between the air collecting flow path and the air inlet, and
when inside air is introduced to the housing through the back seat air vent, the configuration of the opening and closing door structure is controlled to close air circulation between the rear extending flow path and the air outlet.

15. The method of claim 13, further comprising controlling, by the controller, a power transmission structure, the power transmission structure connecting the air collecting door and the back seat air-conditioning door such that opening the air collecting door and closes the back seat air-conditioning door at the same time or closes the air collecting door and opens the back seat air-conditioning door at the same time.

* * * * *